H. D. GRINNELL.
ELECTRIC LIGHTING DEVICE FOR MOTOR VEHICLE LAMPS.
APPLICATION FILED MAR. 21, 1908.
1,047,045.
Patented Dec. 10, 1912.
3 SHEETS—SHEET 1.
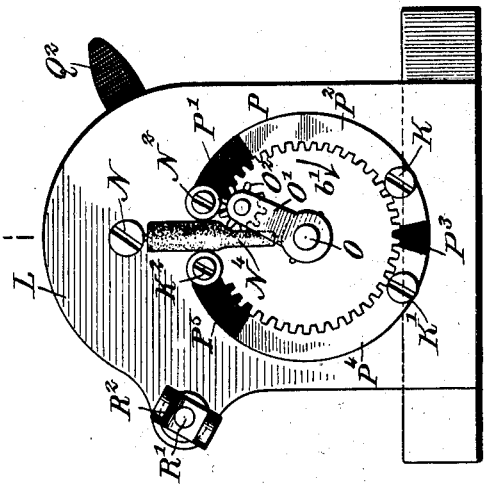
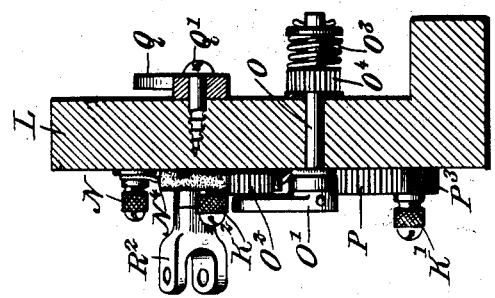
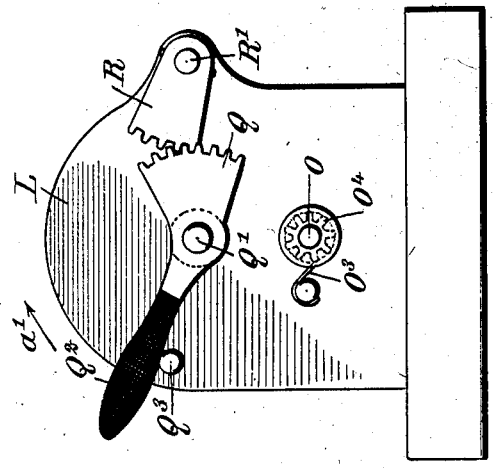
WITNESSES
INVENTOR
Harold D. Grinnell
BY
ATTORNEYS H. D. GRINNELL.
ELECTRIC LIGHTING DEVICE FOR MOTOR VEHICLE LAMPS.
APPLICATION FILED MAR. 21, 1908.
1,047,045.
Patented Dec. 10, 1912.
3 SHEETS—SHEET 2.
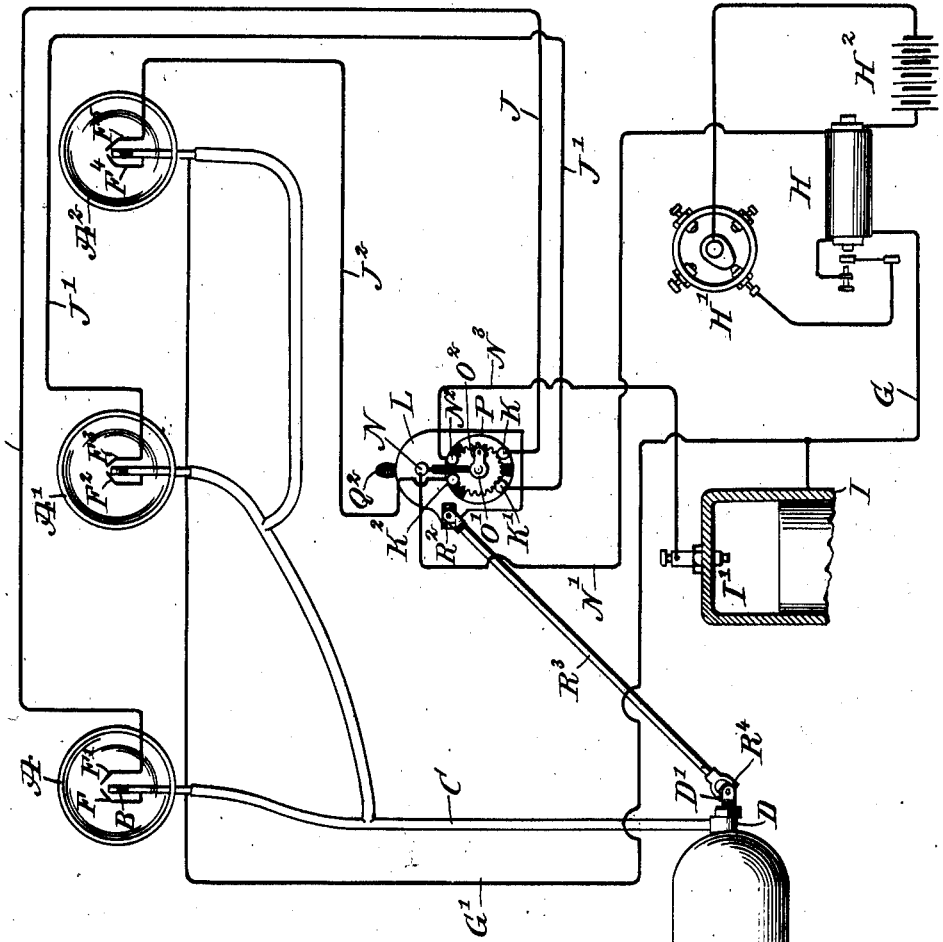
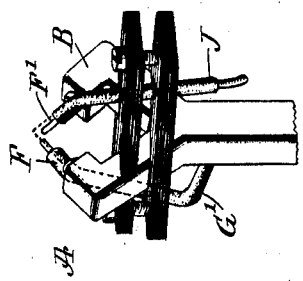
WITNESSES
INVENTOR
Harold D. Grinnell
BY
ATTORNEYS

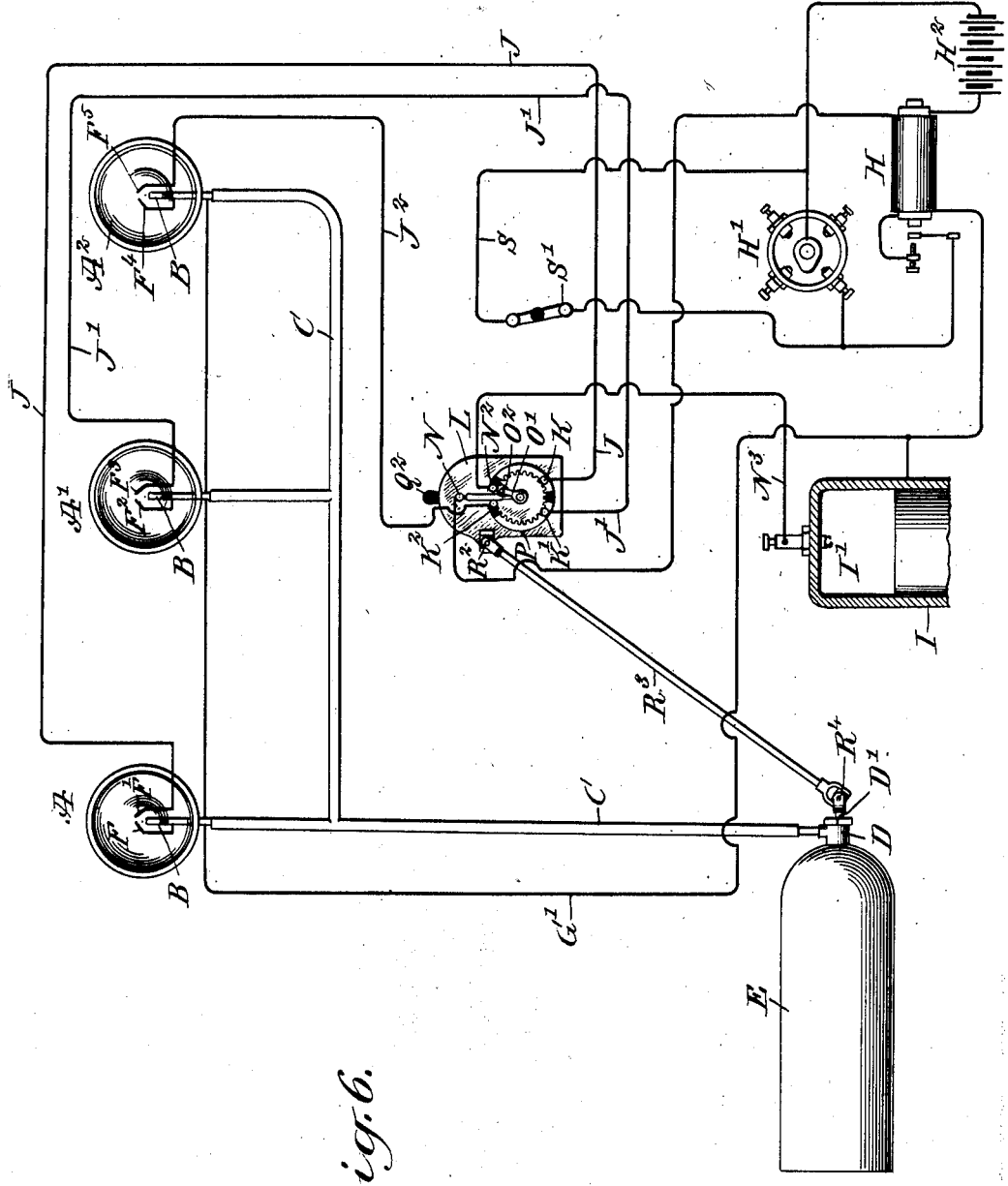

UNITED STATES PATENT OFFICE.

HAROLD D. GRINNELL, OF NEW YORK, N. Y.

ELECTRIC LIGHTING DEVICE FOR MOTOR-VEHICLE LAMPS.

1,047,045.  Specification of Letters Patent. Patented Dec. 10, 1912.

Application filed March 21, 1908. Serial No. 422,507.

*To all whom it may concern:*

Be it known that I, HAROLD D. GRINNELL, a citizen of the United States, and a resident of the city of New York, borough of Manhattan, in the county and State of New York, have invented a new and Improved Electric Lighting Device for Motor-Vehicle Lamps, of which the following is a full, clear, and exact description.

The object of the invention is to provide a new and improved electric lighting device for lighting acetylene and other gas lamps of automobiles and other motor vehicles, in a very simple and convenient manner, without stopping the vehicle or requiring the operator to leave the vehicle.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a front view of the switch in normal or inactive position relative to the electric lighting device when the gas supply for the lamp and the electric current for the sparker are turned off; Fig. 2 is a transverse section of the same on the line 2—2 of Fig. 3; Fig. 3 is a rear face view of the same; Fig. 4 is a perspective view of one of the sparkers; Fig. 5 is a diagrammatic view of the improvement, showing the switch in position after having turned on the gas supply for the lamps, cut off the current for the igniting device of the main cylinder and switched the current to the sparker of the first vehicle lamp; and Fig. 6 is a like view of the same and showing an additional shunt circuit and switch for lighting the lamps when the vehicle is at a standstill.

As indicated in Fig. 5, three acetylene or other gas lamps A, A', A² of any approved construction, are mounted in suitable places on the motor vehicle, and the burners B for the said gas lamps A, A', A² are supplied with gas by a pipe C provided with a gas cock or valve D, connected with the gas supply tank E, arranged on the running board or other part of the motor vehicle. Across the burners B of the gas lamps A, A', A² are arranged the spaced electrodes F, F', F², F³ and F⁴, F⁵ of the sparkers for the said burners, to light the gas by jump sparks, as the gas issues from the burners, as hereinafter more fully explained.

The electrodes F, F², F⁴ are connected by a branch wire G' with the wire G connecting the induction coil H with the cylinders I of the motor, each cylinder having the usual igniting device I' for igniting the explosive mixture at the proper time, controlled by the commutator H', connected with the induction coil H and the battery H² or other source of electricity supply, and likewise connected with the induction coil H. The electrodes F', F³ and F⁵ are connected by wires J, J', J² with binding posts K, K', K² held on the switch board L attached to the motor vehicle, adjacent to the operator, and on the said switch board is arranged a main binding post N connected by a wire N' with the induction coil H, and another main binding post N² held on the said switch board L is connected by a wire N³ with the igniting device I' of one of the cylinders I. It will be understood that the binding posts may be connected with any of the cylinders, and the commutator H' is shown as connected only to the cylinder which has been chosen for convenience.

On the switchboard L is journaled a shaft O, on which is secured an arm O' carrying a pinion O² in mesh with an internal gear wheel P secured to the rear face of the switch board L, and formed of sections P', P², P³, P⁴, P⁵, of which the sections P', P³ and P⁵ are of insulating material, while the sections P² and P⁴ are of metal and connected with the binding posts K and K'. The main binding post N² is located at the end of the insulating section P', and the binding post K², previously mentioned, is located at the end of the insulating section P⁵ (see Fig. 3), and when the arm O' and its pinion O² are in the extreme positions, the pinion contacts with the posts N² and K².

The main binding post N is connected by a wire N⁴ with the shaft O, so that when the latter and its arm O' are in the position shown in Fig. 3, then the circuit for the igniting devices I', for the several cylinders I of the motor, are closed successively by the commutator H' in the usual manner, but when the pinion O² moves out of contact with the binding post N² then the currents for the igniting devices I' are interrupted.

The shaft O is pressed on by a spring O³, to normally hold the pinion O² in contact with the main binding post N², and on the said shaft O is secured a pinion O⁴ adapted to be engaged by a segmental gear wheel Q, mounted to swing on a stud Q′ held on the switch board L, the segmental gear wheel Q being provided with a handle Q², normally resting against a stop pin Q³ attached to the switch board L. The segmental gear wheel Q when in the normal position shown in Fig. 1, is in mesh with a segmental gear wheel R, having its shaft R′ journaled in the switch board L, and the shaft R′ is connected by a universal joint R² with a shaft R³, connected by a universal joint R⁴ with the stem D′ of the gas cock or valve D, for turning the gas on or off, that is, for allowing the gas to pass from the reservoir E to the several burners B, or to cut off the gas when the lamps are not used. By the arrangement described, the operator can turn the valve D more or less, to regulate the flow of gas to the several burners.

When the handle Q² is in the normal position shown in Figs. 1, 2 and 3, then the gas cock D is turned off, the electric circuit for the igniting devices I′ is closed subject to the action of the commutator H′, and the electric current is switched off from the sparkers on the burners B of the several gas lamps A, A′, A². Now when it is desired to light the gas lamps A, A′, A², it is only necessary for the operator to swing the handle Q² temporarily over in the direction of the arrow a′, so that the segmental gear wheel Q first turns the segmental gear wheel R, whereby the shaft R³ is turned and with it the gas cock D, to allow the gas to pass from the reservoir E to the several burners B. The segmental gear wheel Q finally leaves the segmental gear wheel R at the time the cock D is open, and then on the further swinging of the handle Q² in the direction of the arrow a′ the segmental gear wheel Q moves in mesh with the pinion O⁴, thus turning the latter and the shaft O, whereby the arm O′ is caused to swing in the direction of the arrow b′, thus moving the pinion O² out of contact with the main binding post N², thereby interrupting the circuit for the igniting devices I′ of the motor cylinders I. The pinion O² after passing over the insulating section P′ moves in mesh with the metallic section P² carrying the binding post K, whereby the circuit for the electrodes F, F′ is closed, and a jump spark passes from one electrode to the other across the path of the gas now issuing through the burner B. Thus the gas is ignited and consequently the lamp A is lighted. Further turning of the arm O′ in the direction of the arrow a′ causes the pinion O² to leave the section P² and pass over the insulating section P³ onto the metallic section P⁴ carrying the binding post K′, so that the current for the electrodes F, F′ is turned off, while the current for the next pair of electrodes F², F³ is turned on and consequently the second lamp A′ is lighted by the jump spark igniting the gas issuing from the burner B of the second lamp A′. Further turning of the arm O′ in the direction of the arrow b′ moves the pinion O² out of mesh with the section P⁴ and in mesh with the insulating section P⁵, so that the current for the electrodes F², F³ is disconnected, and the pinion O² in finally coming in contact with the binding post K² closes the electric current for the electrodes F⁴, F⁵, whereby the third lamp A² is lighted. The operator now releases the handle Q² so that the spring O³ returns the shaft O, the segmental gear wheel Q, the handle Q² and the arm O′, until the segmental gear wheel Q finally leaves the pinion O⁴ and stands midway between the said pinion O⁴ and the segmental gear wheel R. As soon as the segmental gear wheel Q leaves the pinion O⁴, the spring O³ continues the return movement of the shaft O and the arm O′, until the pinion O² makes contact with the main binding post N², so that the circuit for the igniting devices I′ is again closed.

The above described movement of the handle Q² is very quick, so that only a temporary interruption of the current for the igniting devices I′ takes place, but use is made of this electric current for producing jump sparks at the electrodes F, F′, F², F³ and F⁴, F⁵, as above explained.

It will be noticed that as the handle Q² does not return to the final normal position, it is evident that the gas cock D remains turned on, and when it is desired to turn out the lamps it is only necessary for the operator to swing the handle Q² back to its final position on the stop pin Q³, and in doing so the segmental gear wheel Q will turn the segmental gear wheel R to turn off the gas cock D and thus shut off the supply of gas from the reservoir E to the several burners B.

In order to permit of lighting the lamps A, A′, A² at a time the vehicle is at a standstill, a shunt circuit S having a switch S′ (see Fig. 6) is used to directly connect the battery H² with the induction coil H. The switch S′ is normally open and is only closed when it is desired to light the lamps A, A′, A² at the time the vehicle is at a standstill, it being understood that after the switch S′ is closed the operator swings the lever Q² around, the same as above described, to turn on the gas and to successively close the circuits for the several sets of electrodes F, F′, F², F³ and F⁴, F⁵, and thus light one lamp after the other. When this has been done, the lever Q² is released and the switch S′ is again opened.

Having thus described my invention, I claim as new and desire to secure by Letters Patent:

1. In an electric lighting system, a source of electricity, a set of sparkers, means for electrically connecting the said sparkers in rotation with the said source of electricity, a second set of sparkers, circuits for the said sets of sparkers, and a manually-controlled switch serving to cut out one of the sparkers of the said first set of sparkers and throwing the second set of sparkers into the circuit of the said cut out sparker.

2. An electric lighting system for motor vehicles, in combination with a sparking system for the motors of the vehicle, and a manually-controlled switch mechanism, the said electric lighting system having a gas lamp, a source of gas supply for the gas lamp, an electric sparker for the said gas lamp, and an electric circuit for the gas lamp sparker, and the said sparking system having a source of electricity, a set of motor sparkers for the motor cylinders, circuits for the said motor sparkers, means for controlling the said motor sparker circuits for electrically connecting the sparkers in the said set of motor sparkers in rotation with the source of electricity, and the said manually controlled switch mechanism having means to cut out the sparker circuit for one of the said set of motor sparkers and to connect the said circuit for the lamp sparker with the circuit of the said cut out motor sparker.

In testimony whereof I have signed my name to this specification in the presence of two subscribing witnesses.

HAROLD D. GRINNELL.

Witnesses:
   THEO. G. HOSTER,
   JOHN P. DAVIS.